United States Patent [19]

Espie et al.

[11] Patent Number: 5,239,411
[45] Date of Patent: Aug. 24, 1993

[54] WIDE-FIELD AND WIDE-APERTURE OPTICAL SYSTEM, NOTABLY DESIGNED FOR A NIGHT CHANNEL FOR PERISCOPES, AND PERISCOPE FITTED OUT WITH SUCH AN OPTICAL SYSTEM

[75] Inventors: Jean-Luc Espie, Paris; Isabelle Gonnaud, Antony, both of France

[73] Assignee: Thomson TRT Defense, Guyancourt, France

[21] Appl. No.: 744,395

[22] Filed: Aug. 13, 1991

[30] Foreign Application Priority Data

Aug. 14, 1990 [FR] France ................................. 90 10325

[51] Int. Cl.⁵ .......................... G02B 23/00; G02B 9/12
[52] U.S. Cl. ..................................... 359/362; 359/407; 359/784
[58] Field of Search ................................ 359/642–661, 359/754–797, 691–693, 737, 745–753, 434, 435, 399, 402, 404–407, 410, 420–422, 425–426, 432, 362–366

[56] References Cited

U.S. PATENT DOCUMENTS

| | | | |
|---|---|---|---|
| 3,202,050 | 8/1965 | Seidenberg | 359/646 |
| 3,384,434 | 5/1968 | Scidmore et al. | 359/644 |
| 3,768,890 | 10/1973 | Osawa et al. | 359/644 |
| 3,922,072 | 11/1975 | Rogers | 359/644 |
| 4,017,159 | 4/1977 | Sussman | 359/646 |
| 4,076,978 | 2/1978 | Brennan et al. | 250/213 VT |
| 4,183,626 | 1/1980 | Rogers | 359/746 |
| 4,792,214 | 12/1988 | Wickholm et al. | 359/770 |
| 5,087,989 | 2/1992 | Igarashi | 359/692 |

FOREIGN PATENT DOCUMENTS

| | | |
|---|---|---|
| 124682 | 11/1984 | European Pat. Off. . |
| 0192309 | 8/1986 | European Pat. Off. . |
| 3221184 | 1/1983 | Fed. Rep. of Germany . |
| 636577 | 12/1978 | U.S.S.R. .............................. 359/644 |

*Primary Examiner*—Bruce Y. Arnold
*Assistant Examiner*—Thong Nguyen
*Attorney, Agent, or Firm*—Oblon, Spivak, McClelland, Maier & Neustadt

[57] ABSTRACT

The field of the disclosure is that of enlarging optical lenses and, more precisely, binocular optical systems designed to be inserted into the night-time channel of an observation system, between a light intensifier tube and an observer's eyes. The disclosure can be applied especially to observation instruments for armored vehicles and, notably, periscopes for tanks. The disclosed optical system for a binocular device is of the type constituted by two groups, a forward group and a rear group, the rear group being constituted by a bonded doublet with plane rear face comprising a convergent convex lens bonded to a divergent lens, the lenses of the bonded doublet having different and complementary dispersions to compensate for the chromatism, and the focal length of the doublet ranging from 0.85F to 1.05F, where F is the focal length of the binocular device.

10 Claims, 3 Drawing Sheets

WIDE-FIELD AND WIDE-APERTURE OPTICAL SYSTEM, NOTABLY DESIGNED FOR A NIGHT CHANNEL FOR PERISCOPES, AND PERISCOPE FITTED OUT WITH SUCH AN OPTICAL SYSTEM

BACKGROUND OF THE INVENTION

1. Field of the Invention

The field of the invention is that of enlarging optical lenses and, more precisely, binocular optical systems designed to be inserted into the night-time channel of an observation system, between a light intensifier tube and an observer's eyes.

The invention can be applied especially to observation instruments for armored vehicles and, notably, periscopes for tanks.

However, the optical system of the invention can naturally be applied whenever there is an optical context similar to the one described in detail further below.

In the particular case of armored vehicles, for daytime vision, the driver generally has at least one standard optical periscope known as a daytime channel, comprising an input reflector receiving the light rays, and an output reflector restoring the light rays to him. Depending on the type of periscope, the path of the light rays between the two reflectors may be direct or may undergo one or more reflections.

The daytime channel provides for optimum vision as long as there is sufficient lighting. However, it does not provide for night-time driving. For, it is not possible, at least in combat position, to use lighting means integrated into the vehicle. It is therefore necessary to use an electronic night-time channel that restores a visible image of the outside scene to the pilot and includes, for example, an objective, a light intensifier tube and a binocular device.

2. Description of the Prior Art

However, the known periscopes have dimensions that are too great for them to be adapted to existing day/night equipment. Apart from their major drawback of giving the pilot an image that is less clear than the one given by daytime periscopes, they use the place available between the pilot's eye and the armor, and thus prevent the interposition of a daytime channel.

Since a periscope needs to be easily replaceable, for example in the event of deterioration or malfunctioning or else quite simply in order to carry out maintainance adjustments, it generally takes the form of a compact unit including all its constituent elements (optical ray deflection reflector, mechanical frame for the night-time channel, objectives, light intensifier tube, daytime channel reflectors, etc.).

A variety of mechanisms may be used in order to provide a compact periscope having the smallest possible dimensions.

One mechanism that can be used to change from vision by daytime channel to vision by night-time channel is described, for example, in the French patent application No. 90 07838 relating to a "hinged mechanical frame, notably for periscopes, and periscope mounted on such a frame". The change from one viewing channel to another is done in such a way that the minimum amount of space is needed, by means of a compact mechanism for the control of the tilting of a reflector that directs the light rays selectively towards one channel or another.

For the same purpose, it has also proven worthwhile to consider reducing the size of the binocular devices with which the periscopes are fitted out. For, in a periscope, the binocular device is placed facing the user and thus occupies a relatively large amount of space. The space factor constraint may thus make it necessary for the optical system to include, for example, an elbowed part that enables the light rays emerging vertically from the intensifier tube to be deflected horizontally towards the user's eyes.

Apart from the space factor constraint, another factor governing the designing of a binocular device for a periscope is the need for compatibility with the other elements of the optical chain. Thus, for reasons of modularity and economy, it should be possible for the binocular devices to be matched with the dimensions of existing intensifier tubes, and notably with the dimensions of the periscopes fitted into tanks of the Leclerc, AMX 30 or T (trade names) types.

The designing of a optical system for the night-time channel of a periscope therefore requires a choice of an intensifier tube/binocular device pair.

There also exist known binocular devices for night-time channel periscopes coupled with 20/30 mm intensifier tubes, for example the XX 1380 intensifier tube by PHILIPS (registered name).

However, the field of vision provided by these binocular devices is not wide enough to give satisfactory comfort in the driving of an armored vehicle, and in particular the driving of a tank.

There also exist known formulae for binocular devices adapted to the widely used 25/25 mm intensifier tubes of the MX 9644/UV type, where the coupling between the intensifier tube and the binocular device is done by means of a 25/46 mm enlarging fiber.

The main drawback of this type of binocular device is that the enlargement ratio needed to bring the image to a sufficient diameter is 1.6. This leads to a reduction in the aperture of the fiber at output, and this reduction is incompatible with a wide aperture of the binocular device. This means a darkening of the central part of the field for a nominal position of the observer's eyes, and a loss in contrast due to the fiber. Furthermore, the result of this approach is too cumbersome for most day/night applications.

A third type of binocular system, adapted to periscopes, is applied in 25/40 mm tubes of the TH 9311 type by THOMSON (registered name). These tubes are well adapted to the criteria of space factor and image quality, but have the drawback of being very costly.

Furthermore, there is a known French patent document by ROGERS relating to optical systems for night vision devices, wherein the image is formed on a phosphorus screen, typically an intensifier tube, and is amplified by lenses. The optical systems described are of a type comprising three groups of lenses, all of which are convergent. The first group, which is called a forward group, is characterized by a focal length ranging from 3F to 12F, where F is the focal length of the optical system concerned, the second group, called a median group, has a focal length ranging from 1.6F to 2F and the third group, called a rear group, has a focal length ranging from ranging from 1F to 1.75F. The third group is constituted by a frontwardly convex positive meniscus, the rear face of which may have an infinite radius, i.e. it may be plane.

However, these optical systems cannot be used to obtain a sufficiently small aperture number, so much so that the observer must position his eyes in a reduced zone of space.

Furthermore, it is necessary to devise a radically novel optical formula because the range of efficiency of existing formulae cannot be extended indefinitely by simple quantitative modification. Indeed, for a given optical system, the operating limit is reached as soon as a limit size of lens is reached.

SUMMARY OF THE INVENTION

It is an aim of the present invention, notably, to overcome these drawbacks.

More precisely, a first aim of the present invention is to provide a novel binocular optical system that can be used, notably, in a night-time channel for periscopes, to provide for the transmission of images from the screen output of a light intensifier tube up to the observer's eyes.

Another aim of, the present invention is to provide an optical system such as this for a binocular device that is both a wide-field and a wide-aperture device.

An additional aim of the present invention is to provide a binocular device that takes up little space. Furthermore, the binocular device should be capable of presenting an elbowed glass having the function of deflecting the vertical rays that come from the light intensifier tube towards the eyeglass with a substantially horizontal axis.

An additional aim of the present invention is to obtain an optical system that corresponds to the nominal position of the observer's eyes at about 100 mm from the eyeglass. In this way, the pupils are at a distance from the first diopter in order to enable the presence of a retractable reflector enabling the sending on of the image from one of the channels (the daytime channel for example) when this channel is selected.

Another aim of the present invention is to provide an optical system for the binocular device of a night-time channel, meeting the following specifications:
  input field equal to or greater than 45°;
  enlargement equal to or greater than 0.9;
  sufficiently large aperture of the binocular device, of the order of 100 mm, in order to avoid the impression of looking through a loophole (the standard distance between the eyes may be estimated, for example, to be in the range of 64 mm);
  the focal length should be of the order of 40 mm (for a screen with a diameter of 30 mm): this fact makes it necessary to have a very small number of apertures to keep to the required value of the diameter of the input pupil;
  the overlapping field should be of high quality and wide, at least equal to 15°, in the user's viewing plane. If the user's brain is to reconstruct the image in binocular vision, then the image in each eye should be roughly identical. The overlapping field should therefore cover a high percentage of the field in the central portion of the image;
  the presence of an elbowed glass should enable the deflection, by 90° for example, of the rays emerging from the intensifier tube towards the user's eyes. The presence of an elbow such as this results in additional bulk and introduces off-axis aberrations.

These aims, as well as others that shall appear hereinafter, are achieved by means of an optical system for a binocular device, of the type constituted by two groups, a forward group and a rear group, wherein said rear group is constituted by a bonded doublet with plane rear face comprising a convergent convex lens bonded to a divergent lens, said lenses of said bonded doublet having different and complementary dispersions to compensate for the chromatism, the focal length of said doublet ranging from 0.85F to 1.05F, where F is the focal length of said binocular device.

This essential configuration of the invention makes it possible to let through the rays in the overlapping field without the introduction of an aberration in the axis.

Preferably, the convex face of said convergent lens of said doublet is positioned on the optical axis so as to be approximately centered in the plane of formation of the image, in this case on the screen.

According to one embodiment of the invention, the indices of said convex convergent lens and of said divergent lens range from 1.75 to 1.95 approximately.

According to an advantageous embodiment of the present invention, said forward group is constituted by a front part and a rear part, said front part being constituted by a convergent biconvex lens and a frontwardly concave meniscus, and said rear part is constituted by a biconvex lens.

Preferably, said convergent biconvex lens and said concave meniscus of said front part are separated by a layer of air.

According to another embodiment, said convergent biconvex lens and said concave meniscus of said front part are bonded so as to form a doublet.

Advantageously, said biconvex lens of said rear part has a plane rear face.

According to another embodiment, said rear part is a glass plate with plane and parallel faces combined with a frontwardly convex meniscus located between said front part and said glass plate.

Preferably, said rear part is elbowed.

The presence of an elbow in the optical system according to the invention enables the deflection of the light rays that enter the binocular device, if these light rays should reach the binocular device vertically and should have to be deflected to appear horizontally. This case is typically the one encountered in a periscope, where the driver gets a horizontal view of the light rays emerging vertically from a light intensifier tube.

Advantageously, the optical system according to the invention is of the type designed to be applied to a night-time channel intensifier tube of a periscope, the optical link between the screen output of said light intensifier tube and said system being provided by a fiber wafer at the output of the intensifier tube to which said rear doublet is bonded.

The fact of bonding the doublet averts the presence of a layer of air with an index 1 which would bring about a total refraction of the rays with mean incidence, and hence lead to a smaller overlapping field. The bonding therefore makes it possible to increase the aperture of the fiber artificially.

According to one embodiment of the present invention, the dispersions of the focal lengths of said forward and rear groups respectively range from 1.75F to 2.5F and from 0.85F to 1.05F approximately.

Advantageously, the optical system according to the present invention can be applied to a notable for armored vehicles.

BRIEF DESCRIPTION OF THE DRAWINGS

Other features and advantages of the present invention shall appear from the following description of a preferred embodiment of the present invention, given by way of a non-restrictive illustration, and from the appended drawings, in which.

DESCRIPTION OF THE PREFERRED EMBODIMENTS

Figure 1:
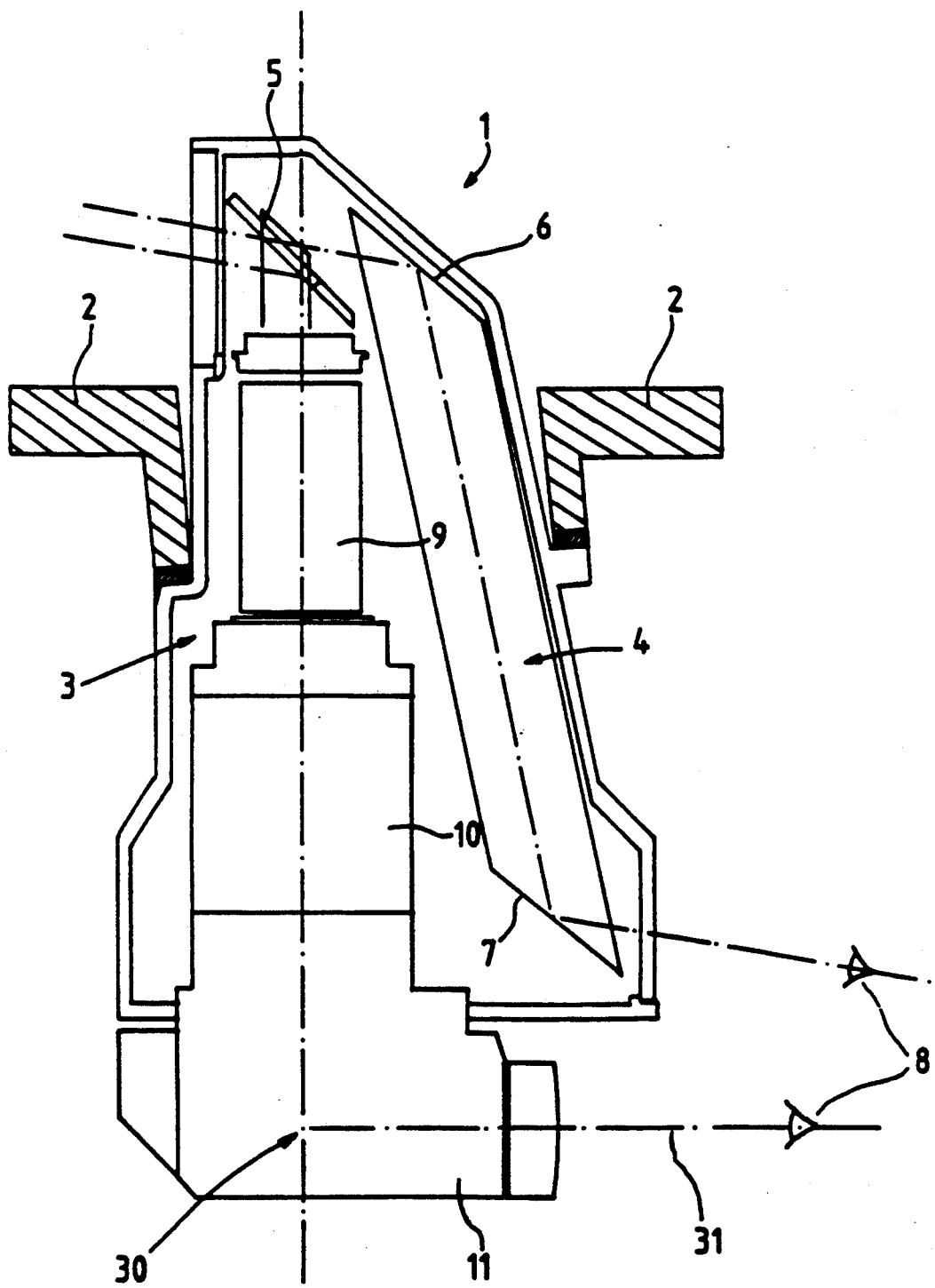
FIG. 1 is a drawing of a vertical section of a periscope including a daytime channel and a night-time channel using an optical system according to the present invention.

FIG. 1 is a drawing of a vertical section of a periscope with a daytime channel and a night-time channel using an optical system according to the present invention.

A periscope 1 goes through the armor 2 of a vehicle. The periscope 1 includes two juxtaposed, independent periscopic devices 3 and 4.

The light rays received by the upper part of the periscope 1 are directed either towards the device 3, called a night-time channel, or towards the device 4, called a daytime channel, depending on the position of the retractable reflector 5. This reflector may notably be a mirror or a triangular prism.

When the light rays are of sufficient intensity, the retractable reflector 5 is folded down in such a way that the light rays go directly into the daytime channel 4.

According to a particular embodiment, the first device 4 may include two reflectors 6 and 7, reflecting the light signals entering the periscope towards an observer 8, typically a driver of an armored vehicle.

The light signals coming from the exterior are reflected by the reflector 6 towards the reflector 7 which sends them towards the observer 8.

When the periscope works in daytime mode, i.e. when the rays are admitted into the device 4, the periscope is unmoving in rotation. It is not necessary to be able to rotate the daytime channel or in other words to pan the viewing field, since known armored vehicles generally have two lateral daytime periscopes.

The change from the daytime channel 4 to the night-time channel 3 is done by the tilting of the retractable reflector 5 above the night-time channel 3. Thus, the light rays admitted into the periscope are directed towards the second processing device 3, and no longer reach the daytime channel 4.

In the configuration of FIG. 1, the night-time channel 3 is constituted by an objective 9, a light intensifier tube 10 and a binocular device 11. The binocular device 11 makes it possible to obtain an image that can be seen by both eyes at the output of the binocular device 11. It has an elbowed part 30 that enables the light rays to be sent on along a substantially horizontal axis 31 towards the observer's eyes. The constitution of the binocular device is described in detail further below.

The light rays coming from the exterior are deflected by the retractable reflector 5 towards the objective 9. They are electronically amplified by the light intensifier 10, penetrate the binocular device 11 and emerge from said binocular device 11 to be seen by the observer 8.

The night-time channel 3 may also be constituted by CCD or other infra-red sensors or by devices for the processing of a light signal. For example, the intensifier tube 10, may be replaced by a camera sensor or a display screen that may or may not be an optical pick-up device.

When the periscope 1 according to the invention is in the night-time position, i.e. when the retractable reflector 5 is in active position (with deflection of the light rays towards the channel 3), the observer 8 may command the movement in bearing of the night-time channel, namely its rotation about a vertical axis. It must be noted that, in the event of pivoting movement, the objective 9 and the intensifier tube 10 advantageously remain still, and only the retractable reflector 5 and the binocular device 11 rotate. This enables the overall space occupied by the periscope to be reduced.

Figure 2:
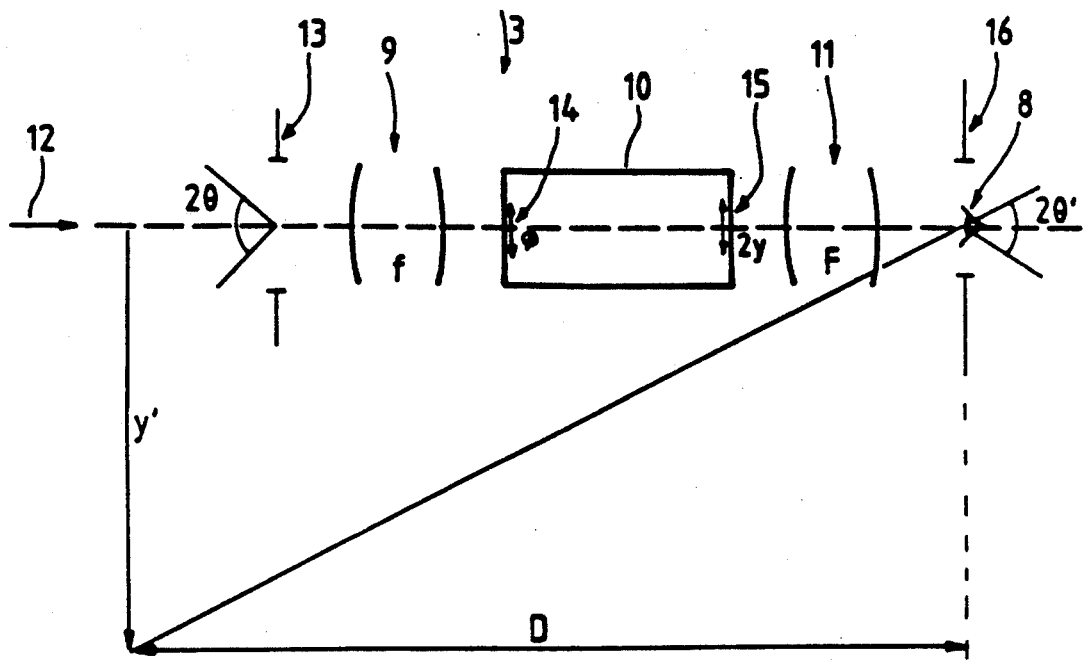
FIG. 2 is a drawing of an optical chain for the night-time channel of a periscope.

FIG. 2 is a drawing of an optical chain for a night-time channel 3 of a periscope.

The light rays enter the optical chain of the night-time channel 3 in the direction 12, and go through an input pupil 13 with an angle, having an aperture $2\theta$, towards the objective 9 having a focal length f. The objective 9 with a focal length f forms an image of the outside scene on the photocathode 14 of the intensifier tube 10 with a diameter $\Phi$. The focal length f, the field $2\theta$ and the diameter $\Phi$ of the photocathode 14 verify the relationship:

$$\Phi = 2f\,tg\theta \tag{1}$$

At its output, the intensifier tube 10 has a screen 15 on which there is an image whose luminance has been amplified. The diameter of the screen 15 is $2y$. The binocular device 11 with the focal length F forms an image of the screen 15 of the intensifier tube 10 at a distance D from an output pupil 16. This image has a size $2y'$ and can be observed in the plane of the output pupil 16 at an angle $2\theta'$. The following relationship is verified:

$$y' = D\,tg\theta' \tag{2}$$

The enlargement G of the night-time channel is defined by:

$$G = tg\theta'/tg\theta \tag{3}$$

The binocular device 11 is characterized by:
its enlargement $g_y = y'/y$ (4)
the diameter of its output pupil $\phi_{ps}$
the angle $2\theta'$ at which the image is seen
its focal length F defined with a good approximation for $D \gg 1$ by $$F \approx y/tg\theta' \tag{5}$$

its aperture number equal to $F/\Phi_{ps}$

The value of y depends on the intensifier tube 10 used.

A particular application of the invention consists in using an intensifier tube 10, wherein the diameter of the photocathode is equal to 20 mm and $2y$ is equal to 30 mm (20/30 tube).

The specifications of the night-time channel determine the values of the enlargement G, the field $2\theta$ and of the diameter of the pupil $\Phi_{ps}$.

In a preferred embodiment of the invention, the following values are taken:

G=0.9
$\theta$=45°
$\Phi_{ps}$=95 mm

Furthermore, D is chosen so as to be close to 2 m, for the enlargement G is less sensitive to variations in D for a longitudinal shifting of the eyes of the observer 8.

if D is great, G=f.enlargement of the intensifier tube.$g_y$/D

The computing of the preceding optical system is done from the given relationships:

from G and $\theta$, the relationship (3) enables $\theta'$, to be obtained;

the relationship (2) enables y' to be obtained from D and $\theta'$;

the relationship (4) enables g to be obtained from y and y';

the relationship (5) gives F from y and $\theta'$.

Furthermore, the relationship N=F/$\Phi_{ps}$ (6) makes it possible to obtain the aperture number N from the focal length F of the binocular device 11 and from the diameter $\Phi_{ps}$ of its pupil.

These values have to be compared with those commonly used in the case of night-time channels for periscopes:

2y ranging from 40 to 46 mm;
G ranging from 0.9 to 1;
$\theta$=45°;
$\Phi_{ps}$=85 mm.

The relationship (6) gives:

N=F/$\Phi_{ps}$=y/tg$\theta'$.$\Phi_{ps}$=y/G.tg$\theta$.$\Phi_{ps}$

Thus, according to the specifications, N is 20% smaller than is commonly achieved, whence the difficulty of combining the above characteristics and, at the same time, providing an image of excellent quality.

When there is distortion, the relationship (1) becomes:

$\Phi$=2ftg$\theta$(1+X) where X is the percentage of distortion.

For X<0, with $\Phi$ given, the product f.tg$\theta$ is higher. This makes it possible to increase the field $\theta$ artificially without correspondingly reducing the focal length. It is then advantageous to introduce a distortion with an opposite sign into the binocular 11 so as not to obtain an excessively deformed final image at output of the binocular device 11.

By way of example, a very low overall distortion (objective+tube+binocular device), of the order of 0.85%, can be obtained.

Figure 3:
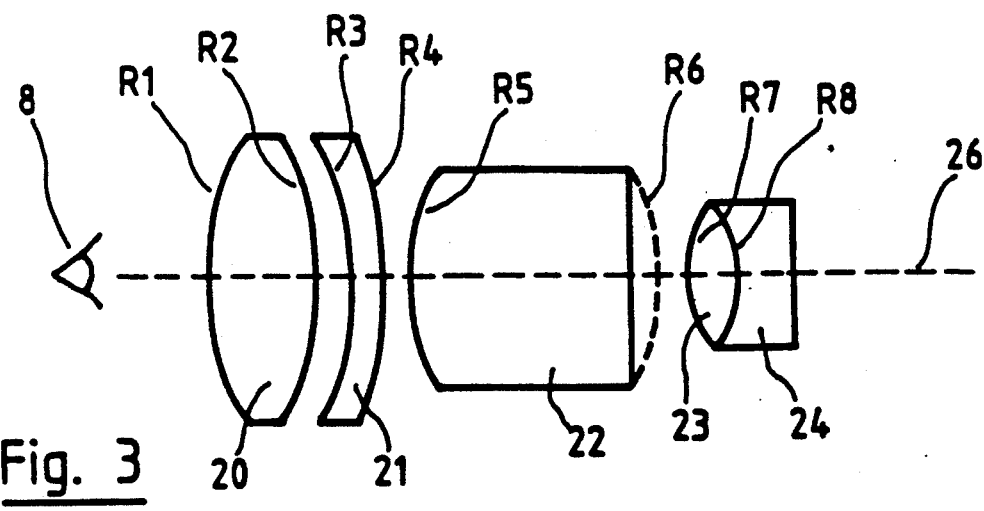
FIG. 3 shows a first embodiment of an optical system according to the present invention.

FIG. 3 shows a first embodiment of an optical system according to the present invention.

The system shown, called system 1, is constituted by two groups of lenses:

a forward group constituted by a front part and a rear part.

The front part is located on the observer 8 side, and is constituted by a convergent biconvex lens 20 and a frontwardly concave meniscus 21. The "front" is defined as being the observer 8 side, and the rear as being the side where the light rays are let in. The biconvex lens 20 has a front radius R1 and a rear radius R2, the front and rear radii of the meniscus 21 being respectively R3 and R4, centered on the axis 26.

The rear part of the forward group is constituted by a biconvex thick lens 22. The front and rear radii of the biconvex lens 22 ar respectively R5 and R6:

a rear group formed by a bonded doublet 23, 24 with plane rear face.

The front radius of the rear group is R7 and the median radius, forming a separation between the two elements 23, 24 of the doublet, is R8.

Table 1 specifies the values of the thickness along each radius represented, the values of the different radii, and the material corresponding to each lens for the system 1.

In this embodiment, the convergent biconvex lens 20 is separated from the frontwardly concave meniscus 21 by a layer of air.

As specified in the table, the rear radius R6 may also be infinite, that is, the rear face of the lens 22 may be plane (as shown in a solid line in FIG. 3).

Figure 4:
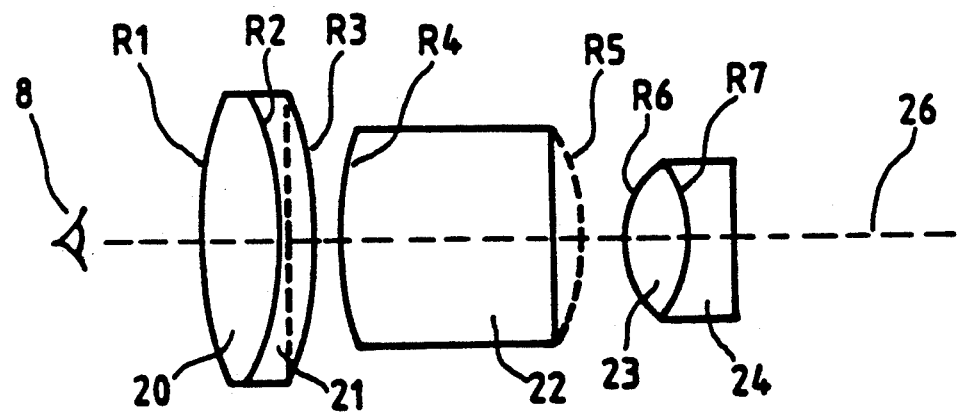
FIG. 4 shows a second embodiment of an optical system according to present invention, constituting a variant of the system of FIG. 3.

FIG. 4 shows a variant of the system 1 of FIG. 2, corresponding to a preferred embodiment of the present invention, called the system 2.

In the system 2, the convergent biconvex lens 20 is bonded to the frontwardly concave meniscus 21. Thus, a biconvex bonded doublet is obtained. It must be noted that the rear face of the biconvex bonded doublet may be plane. The bonded meniscus 21 may have a plane rear face, as shown in dashes. The lens 22 and the doublet 23, 24 remain similar to those of FIG. 1, with only the dimensions of the radii and of the thicknesses being modified.

Table 2 specifies the thicknesses and materials used in the system 2 according to a preferred embodiment of the present invention.

TABLE 1

| Area | Thickness along radius (mm) | Radius (mm) | Corresponding Material Index | Constringence |
|---|---|---|---|---|
| 20, R1 | 27.873 | 91.676 | 1.5168 | 64.17 |
| 20, R2 | 0.734 | −93.116 | | |
| 21, R3 | 3.410 | −91.154 | 1.80518 | 25.43 |
| 21, R4 | 0.836 | 1581.437 | | |
| 22, R5 | 57.927 | 74.086 | 1.80518 | 25.43 |
| 22, R6 | 0.294 | ∞ | | |
| 23, R7 | 18.201 | 30.337 | 1.80318 | 46.38 |
| 23, 24, R8 | 16.274 | −53.147 | 1.84666 | 23.83 |

TABLE 2

| Area | Thickness along radius (mm) | Radius (mm) | Corresponding Material Index | Constringence |
|---|---|---|---|---|
| 20, R1 | 31.002 | 77.535 | 1.5168 | 64.17 |
| 20, 21, R2 | 3.338 | −93.087 | 1.80518 | 25.43 |
| 21, R3 | 0.692 | 747.621 | | |
| 21, R4 | 56.647 | 81.223 | 1.80518 | 25.43 |
| 22, R5 | 0.447 | ∞ | | |
| 23, R6 | 17.641 | 29.104 | 1.80318 | 46.38 |
| 23, 24, R7 | 16.181 | −100.461 | 1.84666 | 23.83 |

Figure 5:
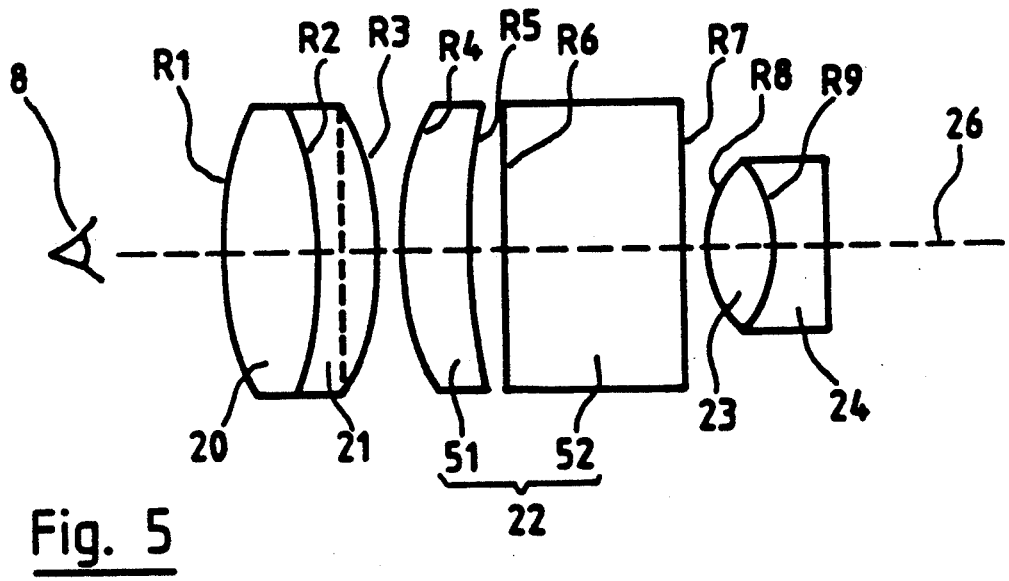
FIG. 5 shows a variant of the optical system shown in FIG. 4.

FIG. 5 shows a variant of the system 2, shown in FIG. 4.

The front part of the forward group and the rear group remain identical to those shown in the system 2 of FIG. 4, with only the dimensions of the lenses being different.

The variant consists in using a frontwardly convex meniscus 51 and a glass plate 52 with plane and parallel faces to constitute the rear part 22 of the forward group.

The following tables 3 and 4 give examples of optical systems corresponding to the geometry of FIG. 5, respectively called system 3 and system 4.

TABLE 3

| Area | Thickness along radius (mm) | Radius (mm) | Corresponding Material Index | Constrigence |
|---|---|---|---|---|
| 20, R1 | 31.474 | 81.226 | 1.5168 | 64.17 |
| 20, 21, R2 | 3.400 | −86.352 | 1.80518 | 25.43 |
| 21, R3 | 0.716 | 1147.70 | | |
| 22, R4 | 15.066 | 92.924 | 1.80518 | 25.43 |
| 22, R5 | 0.689 | −709.581 | | |
| 22, R6 | 42.430 | ∞ | 1.80518 | 25.43 |
| 22, R7 | 0.464 | ∞ | | |
| 23, R8 | 18.487 | 29.013 | 1.80318 | 46.38 |
| 23, 24, R9 | 16.079 | −164.431 | 1.84666 | 23.83 |

TABLE 4

| Area | Thickness along radius (mm) | Radius (mm) | Corresponding Material Index | Constringenece |
|---|---|---|---|---|
| 20, R1 | 24.970 | 151.561 | 1.5168 | 64.17 |
| 20, 21, R2 | 3.394 | −77.005 | 1.80518 | 25.43 |
| 21, R3 | 0.578 | −352.297 | | |
| 22, R4 | 19.747 | 70.928 | 1.85026 | 32.17 |
| 22, R5 | 1.685 | 1192.327 | | |
| 22, R6 | 42.456 | ∞ | 1.80518 | 25.43 |
| 22, R7 | 0.493 | ∞ | | |
| 23, R8 | 18.571 | 30.910 | 1.80318 | 46.38 |
| 23, 24, R9 | 14.258 | −42.799 | 1.84666 | 23.83 |

The bonded meniscus 21 may have a plane rear face, as shown in dashes.

It must be noted that the systems 1, 2, 3 and 4 do not constitute an exhaustive list of the possibilities of configuration of a binocular device according to the present invention, and that other systems will appear easily to those skilled in the art without going beyond the scope of the present invention.

In the case of a use of a system according to the invention in a night-time channel for periscopes, it is advantageous to have an elbowed lens among those forming a binocular device. The function of an elbowed lens such as this is to deflect the light rays emerging vertically from a light intensifier tube towards the user's eyes.

In an advantageous embodiment of the present invention, the rear part of the forward group of the binocular device is elbowed. Thus, the rear group is in the axis of the intensifier tube, the rear part of the forward group deflects the light rays by 90° and sends them towards the front part of the forward group, i.e. towards the user. Thus, in FIGS. 3 and 4, it would thus be a lens 22 that is elbowed and, in FIG. 5, it would be the glass plate 52.

The main characteristic of the present invention is that the rear group is constituted by a bonded doublet made of two materials with very high refraction indices and different and complementary dispersions to compensate for the chromatism, for example, the materials can include a flint type glass and a crown type glass (the dispersion being defined as being characteristic of the variation in refraction index as a function of the wavelength).

The focal length of the doublet 23, 24 ranges from 0.85F to 1.05F, where 1.05F is the focal length of the combination of lenses of the optical system.

The refraction indices of the two lenses of the doublet range from 1.5 to 1.95 and preferably from 1.75 to 1.95.

The purpose of the rear doublet is to let through the rays in the overlapping field, without introducing any aberration on the axis.

An advantageous embodiment of the invention thus consists in localizing the convergent lens on the optical axis so as to substantially center the convex rear face of the convergent lens of the doublet in the plane of the image.

The lens 24 of the doublet 23, 24 advantageously has a plane rear face so that it can be easily coupled with a fiber.

The light rays entering the binocular device may notably come from a light intensifier tube placed substantially perpendicularly to an axis going through the binocular device. This configuration of the connection between an intensifier tube and the binocular device leads, however, to a smaller overlapping field since it does not enable rays with an excessively grazing incidence to be taken into account. This drawback is partly compensated for by the bonding of the fiber to the doublet, notably to the lens 24 of the doublet, which artificially increases the aperture of the fiber. Indeed, the presence of a layer of air with a refraction index 1 between the fiber and the doublet would result in a total refraction of the rays of mean incidence and hence in a closing in of the overlapping field. According to this embodiment, the fiber, which may notably be an enlarging fiber, is also coupled to the intensifier tube by bonding.

As described further above, in a periscope, the nighttime channel is generally free in rotation and only the pivoting, reflector, 5 and the binocular device 11 are movable to rotate about a vertical axis. In this case, the rear group (23, 24) and the forward group (20, 21, 22) is free to rotate about the axis going through the intensifier tube.

It must be noted that it is also possible to interpose a simple glass instead of the fiber wafer between the intensifier tube and the binocular device according to the present invention.

The following table 5 gives the values and dispersions of the focal lengths of each of the lenses 20 to 24, for the four examples of systems shown.

TABLE 5

| | SYSTEM 1 | SYSTEM 2 | SYSTEM 3 | SYSTEM 4 | DISPERSION |
|---|---|---|---|---|---|
| 20 | 2.34 F | 2.17 F | 2.16 F | 2.55 F | 2.16 F/2.55 F |
| 21 | −2.63 F | −2.53 F | −2.46 F | −3.03 F | −2.46 F/−3.03 F |
| 22 | 2.27 F | 2.49 F | 2.54 F | 2.17 F | 2.17 F/2.54 F |
| 23 | 0.66 F | 0.74 F | 0.80 F | 0.62 F | 0.62 F/0.80 F |
| 24 | −1.54 F | −2.92 F | −4.79 F | −1.24 F | −4.79 F/−1.24 F |

The following table 6 gives the values and dispersions of the focal lengths of each of the forward and rear groups according to the system chosen.

TABLE 6

| | SYSTEM 1 | SYSTEM 2 | SYSTEM 3 | SYSTEM 4 | DISPERSION |
|---|---|---|---|---|---|
| Forward group | 2.09 F | 2.16 F | 2.23 F | 1.94 F | 1.19 F/2.23 F |
| Rear group | 0.96 F | 0.91 F | 0.9 F | 0.99 F | 0.9 F/0.99 F |

It be noted that, in the tables 5 and 6, the dispersions of each lens correspond respectively to the values of the focal lengths of the lenses in the systems 3 and 4.

The following table 7 gives the ranges of variation of the refraction indices and of the constringent values of each of the lenses 20 to 24 for the spectral band of phosphorus $P_{20}$ Phosphorus $P_{20}$ is used on the output screens of certain intensifier tubes.

TABLE 7

| Lens | 20 | 21 | 22 | 23 | 24 |
|---|---|---|---|---|---|
| Index | 1.48 to 1.75 | 1.75 to 1.85 | 1.75 to 1.95 | 1.75 to 1.95 | 1.75 to 1.95 |
| Constringence | 40 to 70 | 20 to 30 | 20 to 50 | 30 to 50 | 20 to 30 |

The following values have been used for the above four systems:

$\Phi_{ps} > = 96$ mm
$F \approx 40$ mm for an aperture F/0.42.

Crescent distortion has been deliberately introduced into the above systems to compensate for the distortion of the objective of the night-time channel, and the binocular field is equal to or greater than 41.5° (for D substantially equal to 2 m).

One of the main objectives of the present invention is to correct the aberrations of the system, notably astigmatism and curvature. The curvature is defined as being the mean of the two curves of sagittal and tangential astigmatism. Astigmatism appears when the focal length is different for the horizontal (sagittal) direction and the vertical (tangential) direction.

Astigmatism is generally controlled by means of a pattern constituted by a meshwork of vertical or horizontal bars.

Figure 6:
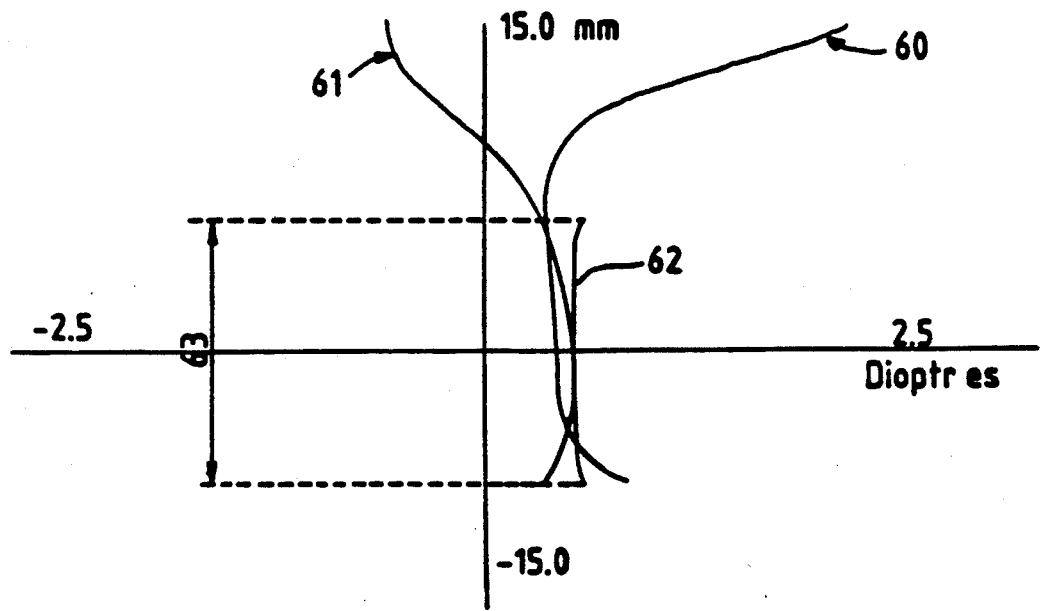
FIG. 6 shows the focal lengths of astigmatism of the optical system of FIG. 4.

FIG. 6 shows, the focal lengths of astigmatism of the system 2, for a distance between pupils of 64 mm.

The reference system represented comprises, on the x-axis, the focal length of the system examined in diopters and, on the y-axis, the height of the object point considered.

The curve 60 corresponds to the focal length of sagittal astigmatism and the curve 61 to the focal length of tangential astigmatism. The field 63 corresponds to the zone of binocular vision (the field zone seen simultaneously by both eyes, or the overlapping field).

In this portion of the field, the astigmatism is far below 0.5 diopter. This enables the observer to achieve a merging of the images seen by each of his eyes without any difficulty.

The image shown has very little or no curvature so that it is seen in a plane. However, it is possible to develop variants with greater curvature so as to give the system the degree of liberty needed to reduce the astigmatism at the edge of the field.

The focal length of an optical system according to the present invention is very small, and is in the range of 40 mm.

The distribution of power is as follows for each of the groups:

forward group: 1.75F/2.5 F with front part: 6F/13F
rear part: 2F/3.5F
rear group: 0.85, F/1.05 F The present invention is notably designed to be used in night-time channel periscopes for armored vehicles, but this application is not restrictive. The optical system according to the invention can also be used in other fields where binocular devices are needed to enable observation.

What is claimed is:

1. A binocular device having an optical system which includes two lens groups, a forward lens a forward group and a rear lens group with the forward lens group closer to a viewing location of an observer with respect to said rear group, wherein said rear group includes a bonded doublet having a plane rear face comprising a convergent convex lens bonded to a divergent lens, said lenses of said bonded doublet having different and complementary dispersions to compensate for chromatism, the focal length of said doublet ranging from 0.85F to 1.05F, where F is the focal length of said binocular device.

2. An optical system according to claim 1, wherein the convex face of said convergent lens of said doublet is positioned on an optical axis so as to be approximately centered in the plane of formation of an image.

3. An optical system according to either of the claims 1 or 2, wherein the indices of said convex convergent lens and of said divergent lens range from 1.75 to 1.95 approximately.

4. An optical system according to claim 1, wherein said forward lens group is constituted by a front part and a rear part, said front part being constituted by a convergent biconvex lens and a frontwardly concave meniscus, and said rear part is constituted by a biconvex lens.

5. An optical system according to claim 4, wherein said convergent biconvex lens and said concave meniscus of said front part are separated by a layer of air.

6. An optical system according to claim 4, wherein said convergent biconvex lens and said concave meniscus of said front part are bonded so as to form a doublet.

7. An optical system according to claim 4, wherein said rear part is elbowed.

8. An optical system according to claim 1, wherein said forward lens group is constituted by a front part and a rear part, said front part being constituted by a convergent biconvex lens and a frontwardly concave meniscus, wherein said rear part is constituted by a plano-convex lens, the rear face of which is plane.

9. An optical system according to claim 1, wherein said forward lens group is constituted by a front part and a rear part, said front part being constituted by a convergent biconvex lens and a frontwardly concave meniscus, and wherein said rear part is constituted by a glass plate with plane and parallel faces that is combined with a frontwardly convex meniscus located between said front part and said glass plate.

10. An optical system according to either claim 1 or claim 2, wherein the dispersions of the focal lengths of said forward and rear lens groups respectively range from 1.75F to 2.5F and form 0.85F to 1.05F approximately.

* * * * *